United States Patent [19]

Edwards

[11] Patent Number: 4,687,233

[45] Date of Patent: Aug. 18, 1987

[54] PIPE CONNECTOR STRUCTURE

[75] Inventor: William D. Edwards, South Jordan, Utah

[73] Assignee: R-Con International, Inc., West Valley City, Utah

[21] Appl. No.: 906,940

[22] Filed: Sep. 15, 1986

[51] Int. Cl.[4] .............................................. F16L 9/14
[52] U.S. Cl. ..................................... 285/55; 285/323
[58] Field of Search .................. 285/55, 322, 323, 15; 138/97, 99

[56] References Cited

U.S. PATENT DOCUMENTS

| 323,567 | 8/1885 | Dillenburg . | |
|---|---|---|---|
| 834,618 | 10/1906 | Herrick . | |
| 2,255,673 | 9/1941 | McDermott . | |
| 2,459,956 | 1/1949 | Muller . | |
| 2,648,551 | 8/1953 | Risley et al. . | |
| 3,244,438 | 4/1966 | Bucheit | 285/15 |
| 3,399,908 | 9/1968 | Kurtz | 285/55 |
| 3,578,805 | 5/1971 | Dutton | 285/55 |
| 4,413,845 | 11/1983 | Lawrence . | |
| 4,457,541 | 7/1984 | Kelly et al. . | |

Primary Examiner—Dave W. Arola
Attorney, Agent, or Firm—M. Ralph Shaffer

[57] ABSTRACT

A pipe connector structure, for coaxial pipe sections having a common liner, and including a pair of flange members, constructed to be drawn together by suitable bolt or other attachment means, which flange members include flange bodies having remote flange ends that are inwardly and downwardly tapered and constructed to coact with pipe securement rings. Between such rings is a sleeve, split in two halves along a diameter thereof for positionment about the liner and constructed, if expanded radially outwardly by radial expansion of the liner, upon the application of internal pressure means, to come in contact with the inner surfaces of the machined flange members to delimit such radial expansion. Alternatively, where the liner is essentially non-radially expandable, then gaps in the split sleeve can be closed and such sleeve and flanges can act conjointly as to the liner to counteract radial liner burst pressures. Pipe ends to be coupled together are positioned against interior shoulders of the split sleeve. Frusto-conical split pipe-gripping rings directly about opposite ends of the sleeve and coact with the flange members to make up the coupling and grip the pipe sections.

8 Claims, 5 Drawing Figures

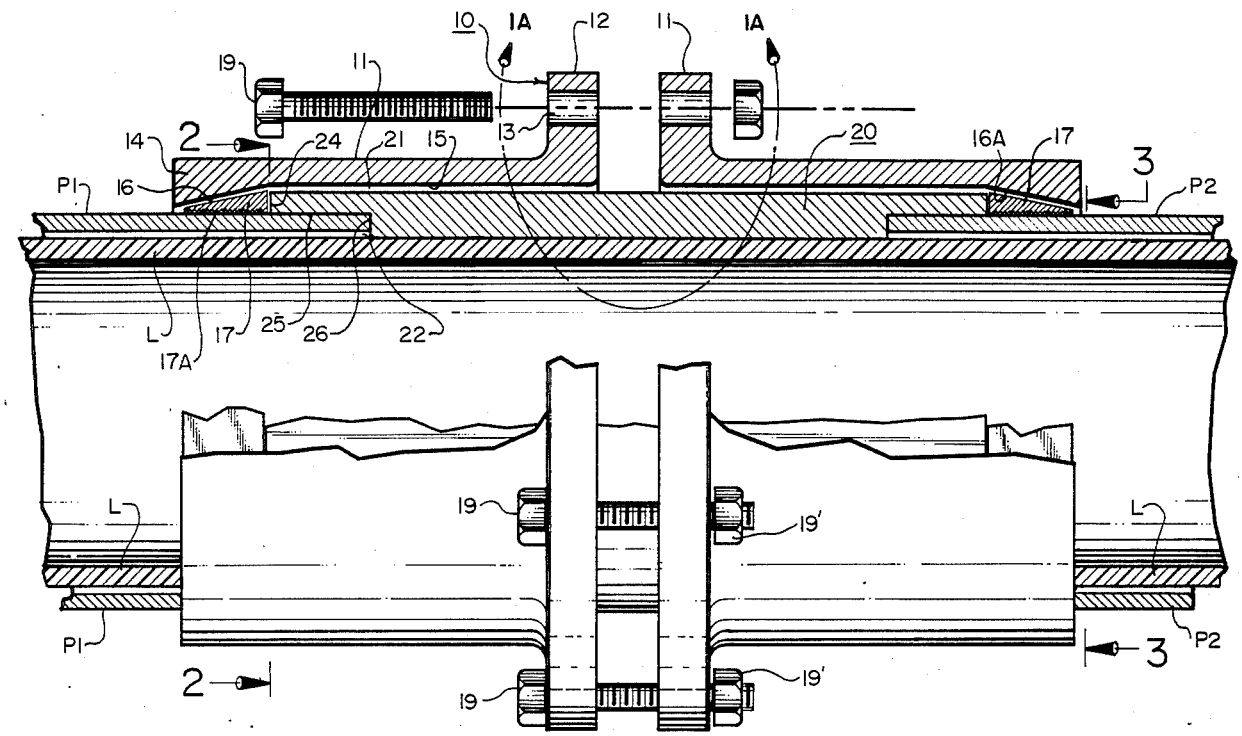
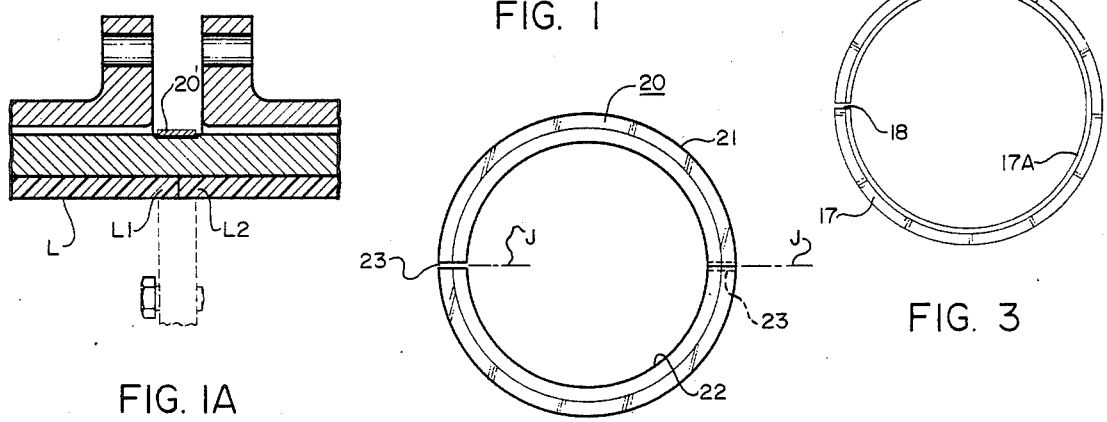
FIG. 1
FIG. 1A
FIG. 2
FIG. 3
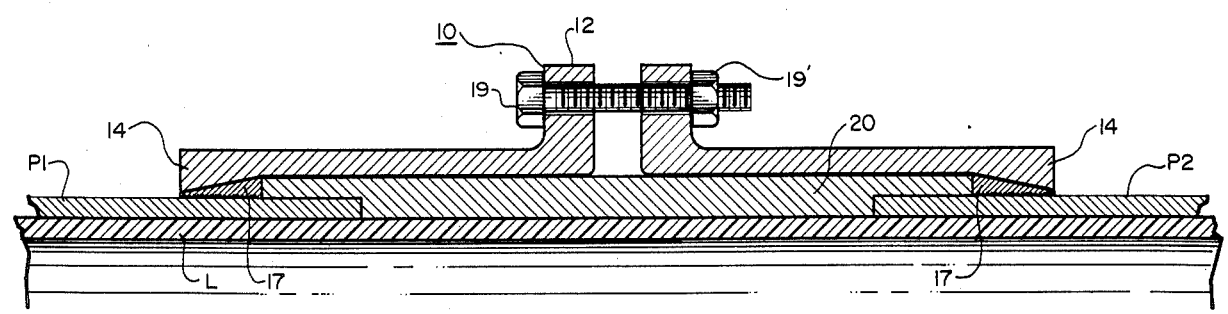
FIG. 4

PIPE CONNECTOR STRUCTURE

FIELD OF INVENTION

The present invention relates to pipe connector structure, including a split sleeve, for coupling the ends of the two pipes or two pipe sections together, where such pipe have a common liner. Both radially expandable and also essentially rigid or non-radially-expandable liners are accommodated. Pipe gripping rings having a slit side directly abut the sleeve; flange members coact with such rings and are designed to provide rigid securement to the pipes and also for delimiting expansion of the split sleeve and hence provide hoop stress holding power relative to the expansion of any radially expandable liner conduit employed.

DESCRIPTION OF PRIOR ART

Current techniques employed in making up or re-working pipe lines now include a liner conduit within the line. This is particularly desirable in connection with pipelines that have highly corroded interiors, by way of example. For extremely long lengths of pipelines, it is very difficult if not impossible to thread the liner through the entire line. Accordingly, a certain small section of the line, in the present invention, is removed, and liner conduit is run through from opposite remote ends of the pipe while the center lines of the opposite pipe sections are askew, and then, in the present invention, the liner is joined by heat fusion. Conventional techniques, however, have relied upon forming liner flanges, and then drawing the flanges together; and also, welded metal flanges and/or screw-threaded pipe connections are supplied the field pipe, such metal flanges being drawn together by suitable bolt attachments. There is thus in the current art, a substantial amount of rework necessitated in the field; more particularly, there is the considerable problem of welding the metal flanges on the ends of the cut pipe in a manner such that the flange faces will be exactly parallel and congruent.

Clearly, a preferred way would be to eliminate welded flanges, the necessity of liner flanges, and also any threaded connections relative to the pipe to be joined.

The liner, or liner conduit previously used, and which can be employed in the present invention, is that marketed under the trademark DRISCO. DRISCO liners, which are non-metallic, are radially expandable under pressure and, when pressure is applied, the liner will "set" to the internal diameter of the pipe within which the liner is run. Such liner will not later contract even though fluid pressure is removed, albeit slight contraction may not necessarily be deleterious under certain operating conditions. The liner contemplated in the present invention will not only include the DRISCO type but also (1) any essentially rigid liner such as metal tubular liners, Fiberglas (trademark) and other types of resin, reinforced liners, and also any type of plastic, elastomeric, other liner which will expand radially under pressure and yet will not malfunction or unduly contract once pressure is removed. Such materials which could possibly be used are the rubber compounds, Neoprene, polyethelene plastic, or other suitable non-metallic liner conduits.

Certain U.S. patents are known which relate in general to the invention as to interpipe coupling, the use of frusto-conical pipe securement rings, flange members that are to be drawn together through torquing connecting bolts, and so forth.

U.S. patents known are as follows:
323,567; 2,648,551; 843,618; 4,413,845; 2,255,673; 4,457,541; 2,459,956.

The use of a split sleeve standing alone, though totally dissimilar to that from the present invention, is taught in the above-identified patent 2,648,551. None of the art above recited, however, taken singly or in combination, teaches the concept of structure of providing an interior liner the exterior surface of which is restrained, radially, by the split sleeve employed, or the essential elimination of extraneous seals in pipe conduit couplings; nor is there taught the concept of employing interior machined surfaces of the flange members used as delimiting abutments for any expandable sleeve which in turn delimits the radial expansion of the liner within the pipe. Other advantageous features of the invention, not disclosed in the prior art, will be pointed out hereinafter.

BRIEF DESCRIPTION OF PRESENT INVENTION

According to the present invention, a pair of exterior flange members are used and are drawn together by bolt and nut or stud attachments, for example. The mutual advance of the flange members operates to constrict a pair of gripping rings that are mounted over a pair of coaxial pipe lengths to be coupled together. The pipe lengths are provided with a common liner which is exposed between the spaced ends of the pipe. A split sleeve encompasses the exposed liner, abuts the gripping rings, and has interior shoulders abutting the pipe ends. The flange members are mounted over the split sleeve and constrain against outward radial burst-pressure deformation movement of nominally fixed-diameter conduit liners or, in another form of the invention, appropriately delimit radial expansion of expandable liners operating against the expansion characteristic of the sleeve.

Thus, when the flanges are drawn together the rings tend to advance forwardly and also grip into the exterior surface of the pipe to be coupled together. The split sleeve used is radially expandable and, initially, its outer surface is spaced a few thousandths from the interior machined surfaces of the flange members. The aforementioned liner means is run through the pipe and is integral or simply heat fused together at ends proximate the medial area of the split sleeve employed. Once the flanges are both together the structure is ready for use, and this without the necessity of liner flanges being formed, exterior pipe flanges being welded to the pipe, and so forth. Indeed, a seal persists exterior to the liner between its exterior surface and the interior surfaces of opposite halves of the sleeve. Accordingly, the liner serves its function to improving fluid flow through the pipe and, additionally, is constrained to operate itself as a seal relative to interior surfaces of the sleeve used. Note is to be made that the make-up of the pipe-connector structure avoids the use of welded flanges, liner flanges, and so forth.

OBJECTS

Accordingly, a principal object of the present invention is to provide a new and improved pipe connector structure for pipe having liners.

A further object is to provide pipe connector structure that avoids the necessity of employing welded flanges, liner flanges, screw-thread pipe connections, and so forth.

An additional object is to provide a pipe connector structure a split sleeve for location fit and, also, that can adjust to any radial liner expansion and yet be constrained, to delimit such expansion, by means of interior surfaces of the flange members employed.

An additional object is to provide a structure and method for reworking pipe lines in the field, for example, where one or more liners are to be inserted in pipelines, the pipelines are split and sectioned at appropriate areas, and the conduit liner structure of the invention is inserted conveniently of a minimum expense.

BRIEF DESCRIPTION OF THE DRAWINGS

The present invention may best be understood by reference to the following description, taken in connection with the accompanying drawings in which:

FIG. 1 is a side view, broken away and principally in section, of a portion of a pipeline wherein a section thereof has been removed, liner conduit installed, and the pipe connector structure of the present invention attached and employed to secure the pipe together coaxially.

FIG. 1A is an enlarged detail taken along the arcuate line 1A—1A in FIG. 1.

FIG. 2 is an end view of the split sleeve employed in the structure of FIG. 1.

FIG. 3 is an end view of a representative slit end ring, employed at opposite ends of the connector structure for abutting the ends of the split sleeve employed and also for gripping the exterior surfaces of the pipe sections to be joined.

FIG. 4 is a detail of the structure of FIG. 1 where pressure fluid flows through the pipe liner, the pressure of such fluid radially expanding the liner outwardly so as to totally abut against the inner walls of the pipe and also the inner wall of the split sleeve, such expansion being delimited by the sealing contact of the outer surfaces of opposite halves of the split sleeve against the inner machined surfaces of the flanges; FIG. 4 is also applicable to initially, and pressurized, essentially rigid conduit applications.

DETAILED DESCRIPTION OF PREFERRED EMBODIMENTS

In FIG. 1 the ends of pipes P1 and P2 are coaxial, spaced apart, and are intended for mutual coupling together. In this regard, pipe connector structure 10 is provided and includes several parts among which are a pair of flanged members 11 each having a radial flange 12 provided with a series of bolt apertures 13 and also provided with flange body 14. The inner surface 15 of each flange member 11 is machined to provide a radially inwardly projecting, frusto-conical tapered inner end surface 16A which is inwardly inclined as shown. These remote end surfaces of the two flange members 11 engage the correspondingly tapered, inclined frusto-conical surfaces 16 of pipe gripping rings 17 that directly abut sleeve 20.

These rings 17 are shown representatively in FIG. 3 where it is seen that a slit at 18 of from 10 to 25 thousandths of an inch exists so that the rings can be compressed together to grip, at serrated ring surfaces 17A, the outer surfaces of pipes P1 and P2. This gripping action is facilitated by bolts or studs 18 that are provided with nuts 19.

Split sleeve 20, see also FIG. 2, is comprised of a hemicylindrical pair of sleeve halves 21 and 22 which are essentially equivalent in construction and which, if expanded in a manner as hereinafter explained, will reveal a diametrical gap 23 of the order of 10 thousandths of an inch, by way of example.

Each of the sleeve halves includes opposite ends 24 against which slit rings 17 abut. Also included are machined surfaces 25 providing pipe end abutment shoulders 26.

Liner L can be a non-metallic radially expandable liner or liner conduit, fabricated from high-density polyethelene and/or an elastomeric material such as rubber, Neoprene, and so forth. Certain sophisticated liners have been developed that can also be employed, which are non-metallic in nature, one termed a DRISCO liner which is radially expandable under fluid pressure and which is capable of expanding, maintaining an expansion set, and maintaining securement against the inner walls of the pipes P1 and P2 after initial fluid pressure is applied as a consequence of fluid flowing through the liner under pressure. For some applications an essentially non-expandable liner L can be employed, such as a metal, Fiberglas, or other resin-filament system conduit liner, for example, in which event the opposite halves of split sleeve 20, split only for the purpose this time of encompassing the conduit liner, can meet at junction J in FIG. 2.

The liner may comprise a single unitary part or, more probably, in connection with field maintenance of long pipelines, the liner will be split so as to have contacting ends L1 and L2, see FIG. 1A, which are heat-fused or otherwise secured togther in a conventional manner. In the latter regard, a manually adjustable clamp 20' such as a conventional hose or radiator clamp, or clamp of this type, can be used to initially maintain the liner sections in appropriate position prior to actual tightening down of the bolts or stud structures at 18, 19 in FIG. 1, so as to complete the connector structure assembly and final securement of pipes P1 and P2.

In practice and for ease of assembly, the various parts will be constructed such that a space clearance of a few thousandths of an inch will be supplied at annular spacing 21 and 22.

In assembly and operation the structure performs and operates as follows: Assume first of all that in the field there is a pipeline that has a heavily corroded internal surface and requires a liner or liner conduit. In such event Liner L is provided, its outer circumference is slightly undersized relative to the inner bore of the pipe, this so that the latter can be thrust through the pipe in a desire manner. Preliminary thereto the pipe can be cut such that the section of the pipe approximately the length of the distance between the shoulders 26 of sleeve 20, will be removed. The liner will be either in one piece or, where the pipeline is quite long, liner lengths may be inserted at opposite ends of the pipe and their ends joined in the manner indicated in FIG. 1A as by heat fusion. In such event a liner clamp 20' can be used, preliminarily, to insure that the liner ends remain coaxial and together. At this juncture, and since sleeve 20 is split, the opposite halves as seen in FIG. 2 will be placed about the liner, with pipe ends abutting shoulders 26, and the flange members 11, with pipe gripping rings 17, heretofore slipped over the pipe ends, will be drawn together forwardly and attachments 18, 19 installed.

At this point the pipe ends will abut the shoulders 26 of the split ring sleeve and pipe gripping rings 17 will abut ends 24 of the sleeve, so that tightening of the attachments 18, 19 will produce no axial slippage but simply a radial gripping action of the rings relative to the pipe lengths. These conditions will persist when attachments 18, 19 are tightened down by torque, such action thus producing a slight constriction of the pipe gripping rings 17 such that their serrated surfaces of 17A, preferably supplied, will grip into the outer surfaces of pipes P1, P2. At this point the liner is emplaced, the pipes P1 and P2 are held together by the pipe connector structure 10, and fluid pressure is then to be applied. When this is performed, then the liner, by its nature in one embodiment of the invention as heretofore explained, will expand slighty radially outwardly and generally set. Such expansion closes the circumferential gaps or spacings between the liner L and split sleeve 20 and also between split sleeve 20 and the inner machined surfaces of flange members 11. In fact, these latter surfaces supply the hoop stress holding power for split sleeve 20 and liner L, so as to deter further and unwanted expansion of the liner.

During the application of such fluid pressure the liner will set and form in fact a new inner wall for the pipe. The expansion of sleeve halves 21 and 22 will be restricted by the flange members to only about ten thousandths of an inch, so that there will be no possibility of an extrusion of liner material between the gaps or spaces of the sleeve halves. See the condition of the structure in FIG. 4 showing where fluid pressure has been applied, or where, in a second embodiment of the invention, the conduit liner is essentially rigid and non-expandable radially, no gap 21 is needed, and FIG. 4 will demonstrate both no-pressure and pressurized conditions. In such event the sleeve and flanges secure against burst-pressures relative to the liner.

Additionally, it is important to know that there is no use for use of additional sealing structures such as gaskets, O-rings, or otherwise necessary machined recesses accommodating the same. Further, there need be formed no flanges as to the liner relative to liner ends, see FIG. 1A, for joining the same together since heat fusion is generally sufficient in connection with the expansion sleeve 20 for precluding possible leakage at this point. Any possible leakage of the junction of the seam at ends L1 and L2 of the liner sections in FIG. 1A and the ten thousandths gap defined by the spacing 23 between the split sleeve halves is minimal and inconsequential.

Accordingly, the present invention illustrates means whereby long pipeline, for example, can be easily accommodated with inner liners that can be either one piece or two pieces and joined. The split sleeve construction herein allows for initial pressurized expansion of a liner, where used, with the flange members 11 delimiting such expansion and predetermining hoop stress holding power together with the sleeve, relative to the liner wall.

It is noted that the invention hereinabove described avoids the necessity of employment of screw-threaded structures wherein one of the pipe lengths has to be turned, and likewise avoids the use of welded flanges in the field which is often difficult to perform, especially in maintaining the pipe on center line and the flanges perfectly plumb during the welding operation. The present invention greatly reduces the cost of field maintenance and general pipe joint installation as may be desired.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In combination, a pair of coaxially aligned pipe mutually spaced apart, a conduit liner disposed through said pipe pair, a split sleeve comprising a pair of hemicylindrical sleeve halves circumferentially disposed about and circumferentially engaging said conduit liner between said pipe pair, said sleeve halves each having remote ends and arcuate, inner, edge recesses proximate said ends and defining shoulders abutting said pipe pair, respectively, a pair of slit, pipe-gripping rings circumferentially disposed about respective ones of said pipe pair and directly abutting said ends of said sleeve halves, said rings having respective mutually remote ends and respective outer, annular, tapered surfaces constituting essentially frusto-conical surfaces tapering progressively radially inwardly proximate said remote ends, a pair of flange members each having a radially outwardly extending flange provided with mutually aligned attachment apertures and respective flange bodies integral with and extending in opposite axial directions from said flanges and over said split rings, respectively, and also over said split sleeve and conduit liner prior to the latter's initial fluid pressurization, said flange bodies having frusto-conically tapered interior end surfaces configured in correspondence with said outer frusto-conical surfaces of said rings, respectively, and attachment means engaging said flanges and said apertures for tightening said flanges toward each other to thereby cause said rings to contract and thereby grip said pipe proximate said ends of said sleeve halves.

2. The structure of claim 1 wherein said conduit liner comprises a pair of coaxially aligned liner lengths edge-secured together end-to-end intermediate said split sleeve.

3. The structure of claim 1 wherein said liner conduit is non-metallic and radially expandable, said flange members being radially closely spaced from the outer surfaces of said split sleeve halves in a location fit, said split sleeve halves expanding radially outwardly upon the presence of fluid pressure within said conduit liner and said conduit liner radially expanding thereby, the inner surfaces of said flange bodies delimiting radial expansion of said sleeve halves and said conduit liner proximate thereto, said flange bodies supplying hoop-strength retention delimiting said conduit liner's radial expansion.

4. The structure of claim 1 wherein said flange members are radially closely spaced from the outer surfaces of said split sleeve halves, said conduit liner comprising a pair of liners having proximate ends heat fused toether end-to-end medially within said sleeve, said split sleeve halves expanding radially outwardly upon the presence of fluid pressure within said conduit liner to engage said flange bodies, the inner surfaces of said flange bodies restricting sleeve expansion and thereby delimiting conduit liner radial expansion and supplying hoop-strength retention to said split sleeve and said conduit liner.

5. The structue of claim 1 wherein, when said conduit liner is radially expanded, a fluid seal area persists between said liner and said sleeve halves and also between said flange bodies and said sleeve halves.

6. In combination, a pair of coaxially aligned pipe mutually spaced apart, a conduit liner, radially expandable under liner-interior fluid pressure, disposed through said pipe pair, a sleeve comprising a pair of hemicylindrical sleeve halves circumferentially disposed about said conduit liner between said pipe pair, said sleeve halves each having opposite ends and, proximate thereto, arcuate, inner, edge recesses defining shoulders abutting said pipe pair, respectively, a pair of split, pipe gripping rings circumferentially disposed about respective ones of said pipe pair and directly abutting opposite ends of said sleeve halves, said rings having respective mutually remote ends and respective outer, annular tapered surfaces constituting essentially frusto-conical surfaces tapering progressively radially inwardly proximate said remote ends, a pair of flange members each having a radially outwardly extending flange and respective flange bodies integral with and extending in opposite axial directions from said flanges and over said split rings, respectively, said flange bodies having, frusto-conically tapered interior end surfaces configured in correspondence with said outer frusto-conical surfaces of said rings, respectively, and means engaging said flanges for tightening said flanges toward each other to thereby cause said rings to contact and thereby grip said pipe proximate said ends of said sleeve halves.

7. For coupling together the proximate ends of a pair of coaxially aligned pipes having mutually spaced proximate ends: in combination, a conduit liner radially expandable under liner-interior fluid pressure, disposed through and lining said pipe pair, a sleeve comprising a pair of hemicylindrical sleeve halves circumferentially disposed about and engaging said liner between said pipe, said sleeve halves each having opposite ends and arcuate, inner, edge recesses proximate said ends and defining shoulders abutting said pipe pair, respectively, a pair of slit, pipe-gripping rings for circumferential disposition about respective ones of said pipe pair and directly abutting opposite ones of said shoulders of said sleeve halves, said rings having respective mutually remote ends and respective outer, annular tapered surfaces constituting essentially frusto-conical surfaces tapering progressively radially inwardly proximate said remote ends, and a pair of flange members each having a radially outwardly extending flange and respective flange bodies integral with and extending in opposite axial directions from said flanges and over said split rings, respectively, said flange bodies having frusto-conically tapered interior end surfaces configured in correspondence with said outer frusto-conical surfaces of said rings, respectively, and means engaging said flanges for tightening said flanges toward each other to thereby cause said rings to contract and thereby grip said pipe proximate said ends of said sleeve halves.

8. In combination, a pair of coaxially aligned pipe having inner walls and mutually spaced apart, a radially expandable non-metallic conduit liner constructed for initial pressure expansion set against said pipe inner walls and disposed through said pipe pair, a sleeve comprising a pair of hemicylindrical sleeve halves circumferentially disposed about said liner between said pipe, said sleeve halves each having opposite ends, and, proximate thereto, acruate, inner, edge recesses defining shoulders abutting said pipe pair, respectively, a pair of split, pipe gripping rings circumferentially disposed about respective ones of said pipe and abutting said opposite ends of said sleeve halves, said rings having respective mutually remote ends and respective outer, annular tapered surfaces constituting essentially frusto-conical surfaces tapering progressively radially inwardly proximate said remote ends, and a pair of flange members each having a radially outwardly extending flange provided with mutually aligned attachment apertures and respective flange bodies integral with and extending in opposite axial directions from said flanges and over said split rings, respectively, said flange bodies having frusto-conically tapered interior end surfaces configured in correspondence with said outer frusto-conical surfaces of said rings, respectively, and attachment means engaging said flanges and said apertures for tightening said flanges toward each other to thereby cause said rings to contract and thereby grip said pipe proximate said ends of said sleeve halves.

* * * * *